Patented Sept. 28, 1954

2,690,444

UNITED STATES PATENT OFFICE 2,690,444

PROCESS FOR THE PREPARATION OF KETALS

James Lake Harvey, New Castle, Del., assignor to Atlas Powder Company, Wilmington, Del., a corporation of Delaware No Drawing. Application March 30, 1951, Serial No. 218,547

11 Claims. (Cl. 260—340.7)

This invention relates to a chemical process. More specifically, it relates to a novel chemical process for the preparation of a cyclic ketal.

It is the object of this invention to provide an improved process for the preparation of a cyclic ketal of a polyol to produce alkylol substituted compounds of the dioxolane and/or dioxane types.

The preparation of cyclic ketals by the reaction of ketones with polyols in the presence of catalysts is well known. This reaction has been performed in the presence of such materials as hydrochloric acid, zinc chloride, potassium bisulfate and others. However, it is frequently sluggish and often poor in yield even in the presence of the known catalysts.

In accordance with the present invention it has been found that shorter reaction times and higher yields are possible when the condensation is performed in the presence of catalytic amounts of iodine.

The reaction is conveniently performed by refluxing the polyol and ketone in the presence of the iodine at atmospheric pressure. Pressures higher or lower than atmospheric may be employed, frequently with the advantages of facilitating condensation and/or improving the removal of water formed in the reaction mixture. If the ketone is water insoluble, it may be used in excess to promote azeotropic removal of the water formed. Other water immiscible solvents with suitable boiling points such as toluene, xylene and the like, are likewise suitable in this role.

Normally the reactants along with the water immiscible solvent and catalyst are charged into a reaction vessel fitted with a reflux condenser equipped with a water trap and a stirrer, and heat is applied. In come cases, it has been found advantageous to add the iodine catalyst stepwise during the course of the reaction. Generally as little as 0.025% iodine by weight based on total charge, is effective. Larger amounts may be employed without deleterious effects. Initially the reaction mass is a deep brown. As the reaction temperature is approached the intensity of the color normally diminishes to colorless. In some cases this coloration may gradually reappear as the reaction progresses. More frequently, however, the reaction mass remains substantially colorless.

The reaction is particularly valuable in the formation of esters containing multiple unesterified hydroxyls. Cyclic ketals of glycerol and higher polyols can be formed which contain free hydroxyl available for esterification. After the esterification the ketal can be hydrolyzed to a polyol under conditions much milder than those which would affect the ester linkage. Among the aliphatic polyols which are suitable may be mentioned glycerol, pentaglycerol, the tetritols, the pentitols, and the hexitols, such as sorbitol, mannitol and dulcitol, hexane pentols and the like. Furthermore, ethers and inner ethers such as polyglycerol and the hexitans, sorbitan and mannitan, may be used.

The polyhydric aliphatic alcohol may be reacted with any saturated aliphatic or carbocyclic or any mixed saturated aliphatic carbocyclic unsubstituted ketone. Those boiling above 90° C. are preferable when operating at atmospheric pressure. Among such ketones are included the dialkyls, such as dimethyl, diethyl, dipropyl, diisopropyl, dibutyl, diisobutyl, diamyl, methylethyl, methylpropyl, methyl isopropyl, methylbutyl, methylisobutyl, methyl-t-butyl, methylamyl, ethylpropyl, ethylbutyl, ethylisoamyl, propylisobutyl ketone, tridecanone, the carbocyclics such as cyclopentanone, cyclohexanone and the mixed ketones such as cyclohexylmethyl, cyclohexylpropyl and the like.

The products formed by the reaction correspond to alkylol substituted 1,3-dioxolane and 1,3-dioxanes. Where the hydroxyl groups are vicinal such compounds as 2,2-dialkyl-4-hydroxyalkyl-1,3-dioxolane; 2,2-polymethylene-4-hydroxyalkyl-1,3-dioxolane; 2,2-dialkyl-4,5-di-(hydroxyalkyl)-1,3-dioxolane; the mono- and di-alkylidenes of hexitol; hexitan ketal and the like may be formed. In polyols containing more than four carbon atoms and at least three hydroxyl groups, spacial configuration may permit formation of 1,3-dioxane structures such as 2,2-dialkyl-4-hydroxyalkyl-1,3-dioxane; 2,2-polymethylene-4-hydroxyalkyl-1,3-dioxane; 2,2-dialkyl-4,6-di-(hydroxyalkyl)-1,3-dioxane; the corresponding 5-hydroxyalkyl and 5-alkyl-5-hydroxyalkyl-1,3-dioxanes and the like.

The following examples are cited to illustrate the invention. They are not intended to limit it in any manner.

*Example I*

A three-liter reaction flask, equipped with two Barrett receivers was charged with 484 g. (five mols) of U. S. P. 95% glycerol, 1000 g. (ten mols) of methylisobutyl ketone, 200 g. of toluene and 0.50 g. (0.03% of the total charge) of iodine as catalyst. The purpose of the toluene and excess ketone is to assist in removal of water formed as a result of the condensation. As heat is applied the color due to the iodine diminishes. The solution is colorless when the refluxing temperature is attained. The mixture is refluxed with agitation until completion of the reaction is indicated by the quantity of water formed. The reaction mass is then distilled. After removal of toluene and excess ketone, the desired product 2-methyl-2-isobutyl-4-hydroxymethyl-1,3-dioxolane is recovered and purified by distillation. A yield of 94% (based on gylcerol) is obtained. The product boils at 72° C., at 0.1 mm. pressure. Substitution in this experiment of 1.0 gram (0.06% based on total charge) of sulfuric acid in place of the iodine, results in a lower yield of ketal as well as substantial amounts of undesired glycerol etherification products.

*Example II*

A five liter reaction flask equipped with two Barrett receivers is charged with 968 g. (ten mols) of 95% U. S. P. glycerol, 1960 g. (twenty mols) of cyclohexanone, 400 g. of toluene and 0.87 g. (0.026% of the total charge) of iodine as a catalyst. The toluene and excess ketone are added to assist in water removal. As heat is applied the color due to the presence of iodine diminishes until the solution becomes colorless at the refluxing temperature. Refluxing with stirring is continued for forty-five minutes at which time completion of the reaction is indicated by water collected. The product, 2,2-pentamethylene-4-hydroxymethyl-1,3-dioxolane is separated and purified by distillation. A 91.2% yield boiling at 89° C., at 1.0 mm. pressure is obtained.

*Example III*

A three liter reaction flask equipped with two Barrett receivers is charged with 600 grams (five mols) of 2-hydroxymethyl-2-methyl-1,3-propanediol, 980 grams (ten mols) of cyclohexanone, 200 grams of toluene to assist in water removal along with excess ketone, and 1.06 grams (0.06% of the total charge) of iodine as a catalyst. The reaction mixture is refluxed with stirring for six hours. The product, 2,2-pentamethylene-5-methyl-5-hydroxymethyl-1,3-dioxane is separated and purified by distillation. A 78% yield, boiling at 114°C., at 0.2 mm. pressure is obtained.

*Example IV*

A reaction flask equipped as described above is charged with 484 grams (5 mols) of 95% U. S. P. glycerol, 1282 grams (10 mols) of methyl n-hexyl ketone and 0.44 gram (0.025%) of iodine. The excess ketone is added to assist in removal of water of condensation. After refluxing with stirring for two and one-half hours a 92% yield of 2 - methyl - 2 - n-hexyl - 4 - hydroxymethyl - 1,3-dioxolane boiling at 144° C. at 13 mm. pressure is separated and purified by distillation.

*Example V*

The following charge when refluxed with stirring for four and one-half hours gives a yield of 92.3% of 2-methyl-2-n-amyl-4-hydroxymethyl-1,3-dioxolane boiling at 97° C. at 2.2 mm. pressure:

| | |
|---|---|
| 95% U. S. P. glycerol | 968 g. (10 mols). |
| Methyl n-amyl ketone | 1713 g. (15 mols). |
| Iodine | 0.67 g. (0.025%). |

The ketone is added in excess to permit removal of water as it forms.

It will be apparent to those skilled in the art that many modifications of the above described process are possible without a departure from the scope of the invention.

What is claimed is:

1. A process for the preparation of hydroxy containing cyclic ketals which comprises the condensation of a member of the class of unsubstituted dialkyl and saturated, unsubstituted carbocyclic ketones with a saturated, unsubstituted, aliphatic polyol containing at least three hydroxyl bearing carbon atoms, two of which are separated by no more than one carbon atom, in the presence of iodine as a catalyst.

2. A process for the preparation of a 2,2-dialkyl - hydroxyalkyl substituted 1,3 - dioxolane which comprises the condensation of a dialkyl ketone with a saturated, unsubstituted, aliphatic polyol containing at least three hydroxyl bearing carbon atoms, two of which are adjacent, in the presence of iodine as a catalyst.

3. A process for the preparation of a 2,2-dialkyl-hydroxyalkyl substituted 1,3-dioxane which comprises the condensation of a dialkyl ketone with a saturated, unsubstituted, aliphatic polyol containing at least three hydroxyl bearing carbon atoms, wherein two of the hydroxyl bearing carbon atoms are separated by one non-hydroxyl bearing carbon, and all groups are non-vicinal, in the presence of iodine as a catalyst.

4. A process for the preparation of a 2,2-polymethylene-hydroxyalkyl substituted 1,3-dioxolane which comprises the condensation of an unsubstituted saturated carbocyclic ketone with a saturated, unsubstituted, aliphatic polyol containing at least three hydroxyl bearing carbon atoms, two of which are vicinal, in the presence of iodine as a catalyst.

5. A process for the preparation of a 2,2-polymethylene-hydroxyalkyl substituted 1,3-dioxane which comprises the condensation of an unsubstituted saturated carbocyclic ketone with a saturated, unsubstituted, aliphatic polyol containing at least three hydroxyl bearing carbon atoms, wherein two of the hydroxyl bearing carbon atoms are separated by one non-hydroxyl bearing carbon atom, and all hydroxyl groups are non-vicinal, in the presence of iodine as a catalyst.

6. A process for the preparation of 2,2-dialkyl-4-hydroxymethyl-1,3-dioxolane which comprises the condensation of a dialkyl ketone with glycerol in the presence of iodine as a catalyst.

7. A process for the preparation of 2,2-polymethylene-4-hydroxymethyl-1,3-dioxolane which comprises the condensation of an unsubstituted saturated carbocyclic ketone with glycerol in the presence of iodine as a catalyst.

8. A process for the preparation of 2,2-polymethylene - 5 - methyl - 5 - hydroxymethyl - 1,3-dioxane which comprises the condensation of an unsubstituted saturated carbocyclic ketone with 2-hydroxymethyl-2-methyl-1,3-propanediol in the presence of iodine as a catalyst.

9. The process as defined in claim 6 wherein the ketone is methylisobutyl ketone.

10. The process as defined in claim 7 wherein the ketone is cyclohexanone.

11. The process as defined in claim 8 wherein the ketone is cyclohexanone.

References Cited in the file of this patent

FOREIGN PATENTS

| Number | Country | Date |
|---|---|---|
| 408,230 | Great Britain | Apr. 3, 1934 |
| 559,845 | Great Britain | Mar. 8, 1944 |

OTHER REFERENCES

Hill et al.: J. A. C. S., vol. 45 (1923), pp. 3108–16.
Hibbert: J. A. C. S., vol. 37 (1915), pp. 1748–63.